United States Patent
Jay

(10) Patent No.: US 6,896,808 B1
(45) Date of Patent: May 24, 2005

(54) RECOVERY OF METAL VALUES FROM AQUEOUS SOLUTIONS AND SLURRIES

(75) Inventor: Bill Jay, Doneaster (AU)

(73) Assignee: Oretek Limited (AU)

( * ) Notice: Subject to any disclaimer, the term of this patent is extended or adjusted under 35 U.S.C. 154(b) by 73 days.

(21) Appl. No.: 10/130,169

(22) PCT Filed: Nov. 9, 2000

(86) PCT No.: PCT/AU00/01383
§ 371 (c)(1),
(2), (4) Date: Aug. 6, 2002

(87) PCT Pub. No.: WO01/34856
PCT Pub. Date: May 17, 2001

(30) Foreign Application Priority Data

Nov. 9, 1999 (AU) .............................................. PQ3934

(51) Int. Cl.$^7$ .............................................. B01D 15/04
(52) U.S. Cl. ........................ 210/638; 75/743; 210/639; 210/651; 210/684; 210/904; 423/24; 423/27
(58) Field of Search ................................. 210/634, 638, 210/639, 650, 651, 684, 688, 904, 681; 423/24–27, 8–10; 75/743, 744

(56) References Cited

U.S. PATENT DOCUMENTS

| | | | | |
|---|---|---|---|---|
| 5,643,456 A | * | 7/1997 | Smith et al. | 210/651 |
| 5,758,255 A | * | 5/1998 | Kerr et al. | 423/8 |
| 5,766,478 A | * | 6/1998 | Smith et al. | 210/638 |
| 5,928,517 A | * | 7/1999 | Smith et al. | 210/650 |
| 6,242,625 B1 | * | 6/2001 | Kordosky | 556/110 |

FOREIGN PATENT DOCUMENTS

| | | |
|---|---|---|
| EP | 0 301 783 A2 | 2/1989 |
| EP | 0355 045 B1 | 5/1995 |

OTHER PUBLICATIONS

Abstract "Gold Extracting Method by Low–Pressure Hot Acid Immersing Polyurethane Foam," Patent No. CN1065684, publication date: Oct. 28, 1992, Inventors Gebo Xie, et al.

* cited by examiner

Primary Examiner—Joseph Drodge
(74) Attorney, Agent, or Firm—Knobbe, Martens, Olson & Bear LLP

(57) ABSTRACT

The invention generally relates to a process for the recovery or removal of metal species from a solution or slurry comprising the steps of: a) contacting the solution or slurry with a polymeric material, selected from the group consisting of a solid superhydrophilic polyurethane polymer containing a chelating and/or solvating agent, a water-insoluble polymeric chelating agent dispersed in a water-insoluble carrier solution, and a water-soluble polymeric chelating or co-ordinating agent to load the polymeric material with metal species wherein said polymeric material; b) separating the loaded polymeric material from the solution or slurry; and c) recovering or removing the metal from the polymeric material. There is also considered a polymeric material for use in the recovery of metal species from a solution or slurry, the polymeric material comprising a solid superhydrophilic polyurethane polymer containing a chelating or co-ordinating agent and/or a solvating agent.

12 Claims, No Drawings

RECOVERY OF METAL VALUES FROM AQUEOUS SOLUTIONS AND SLURRIES

CROSS REFERENCE TO RELATED APPLICATIONS

This is the U.S. national phase under 35 U.S.C. § 371 of International application PCT/AU00/01383, filed Nov. 9, 2000, which claims priority to Australian application PQ3934/99, filed Nov. 9, 1999.

The present invention relates to the recovery of metal values from solutions or from slurries. In particular, the present invention relates to polymeric materials and the use thereof for the recovery of metal ions from solutions or slurries, to processes for the recovery of metal species from solution using these polymeric materials and to methods for the recovery of metal values from these polymeric materials.

Methods for the removal or recovery of metal ions from aqueous solutions may be divided into a number of general categories, namely:

(a) extraction using solid extractants such as functionalised ion exchange resins, activated carbon, and inorganic materials onto the surfaces of which covalently bound functional polymers are fixed;

(b) extraction using liquid solvent extractants solubilised in a solvent which is immiscible with the feed solvent. In this case, large volumes of highly inflammable hydrocarbon solvents are required which can result in the loss of valuable extractant due to either entrainment or its slight solubility in the feed stream;

(c) membrane processes in which one or more of the ions migrating through the pores in a membrane are collected in an affinity solvent on the permeate side of the membrane, or are alternatively concentrated in the retentate;

(d) precipitation, preferably as metal hydroxides, or as carbonates, sulphates, etc. can non-selectively remove metal ions from aqueous streams. However, the metal hydroxide sludges may be difficult to dewater. If a number of metal ions are present, then they will not reach a minimum solubility at the same pH, rendering it difficult to meet effluent standards; and (e) electrolysis methods to recover valuable metal ions from solution in metallic form.

One or more of the above techniques may be used singly, or in combination, in various embodiments of the present invention.

According to one aspect of the present invention there is provided a process for the recovery or removal of metal species from a solution or slurry comprising the steps of:

a) contacting the solution or slurry with a polymeric material, selected from the group consisting of a solid superhydrophilic polyurethane polymer containing a chelating and/or solvating agent, a water insoluble polymeric chelating agent dispersed in a water insoluble carrier solution, and a water soluble polymeric chelating or co-ordinating agent to load the polymeric material with metal species;

b) separating the loaded polymeric material from the solution or slurry; and c) recovering or removing the metal from the polymeric material.

According to another aspect of the present invention there is provided a process for the recovery or removal of metal species from a leach solution or slurry comprising the steps of:

a) contacting the leach solution or slurry with a polymeric material, selected from the group consisting of a solid superhydrophilic polyurethane polymer containing a chelating agent and/or a solvating agent, a water insoluble polymeric chelating agent dispersed in a water insoluble carrier solution, and a water soluble polymeric chelating or coordinating agent to load the polymeric material with metal species;

b) separating the loaded polymeric material from the leach solution or slurry; and c) recovering or removing the metal species from the polymeric material; wherein the leach solution or slurry comprises a metal complex, said leach solution or slurry being contacted with said polymeric material for a period sufficient for the metal to be bound to the polymeric material and at least a portion of the ligands of the metal complex to be displaced therefrom and returned to the leach solution or slurry to be available to coordinate with further metal values.

Each of these aspects and further aspects of the invention will be described in further detail within the following disclosure of the invention.

According to a further aspect of the present invention there is provided a polymeric material for use in the recovery of metal species from a solution or slurry, the polymeric material comprising a solid superhydrophilic polyurethane polymer containing a chelating or coordinating agent and/or a solvating agent.

In the present invention, the term "superhydrophilic polyurethane" will be understood to refer to polyurethanes which may alternatively be described as "highly hydrophilic", "superhydrophilic" or "superabsorbent". These polyurethanes, in their unmodified and expanded state, accept and rapidly absorb significant quantities of water. Materials of this type will absorb a drop of water placed on a surface of the material in a reasonably short period of time, and will also vertically wick and absorb water from a pool.

In the present invention, the term "water insoluble polymer" will be understood to refer to long chain nitrogen-, oxygen-, and/or sulphur-containing polymers. Such polymers have been rendered water insoluble and where applicable, soluble in water insoluble carrier solutions such as kerosene-based hydrocarbon cuts. Polyethyleneimine polymers or polyethyleneimine-based polymers and/or polyethylene glycol or polyethylene glycol-based polymers with molecular weights generally in excess of 500 modified as described herein, represent suitable examples of the water insoluble polymers included in the present invention. Water insoluble polymers can generally be readily incorporated into superhydrophilic polyurethane resinous materials.

In the present invention, the term "water soluble polymer" will be understood to refer to long chain nitrogen-, oxygen- and/or sulphur-containing polymers. Polyethyleneimine polymers or polyethyleneimine-based polymers and/ot polyethylene glycol or polyethylene glycol-based polymers with molecular weights generally in excess of 500 daltons, represent suitable examples of the water soluble polymers included in the present invention. Other examples include polyimine acetic acid, polyimine diacetic acid, polythiourea, poly(1,1-dimethyl-3,5dimethylene pyridinium chloride), poly(2-acrylamide-2-methyl-1-propanesulphonic acid), water soluble polymers with Schiff base chelates attached, water soluble polymers with hydroxy quinolines attached and other water soluble chelating agents well known in the art.

Metal ion complexation reagents used in accordance with this invention may be broadly divided into the following general types, namely:

(1) Molecular Recognition Technology (MRT)

Solvating agents suitable for use in the present invention include macrocyclic ligands. Generally macrocyclic ligands are preferred due to their ability to form a stable complex with the metal ion. Macrocyclic ligands are believed to solvate metal species by sequestering the metal in the centre of the polyether cavity in a host-guest relationship.

Preferably certain macrocyclic ligands, crown ethers and other cryptands are able to capture targeted metal ions (often referred to as Molecular Recognition Technology (MRT)), for example copper, and may be advantageously used to recover this metal ion from solution, particularly in environmental applications such as acid mine drainage and in other applications where the recovery of the copper metal ion from dilute aqueous solutions is desired.

Macrocyclic polyethers (crown ethers) containing a minimum of two and usually at least four ether (—O—) groups in the form of a ring generally exhibit quite different affinities for a given metal ion. Many synthetic macrocyclic polyethers, polyamines, polythioethers, and other related molecules have specific metal ion binding properties. These macrocycles typically contain central hydrophilic cavities ringed with either electronegative or electropositive binding atoms and exterior flexible frameworks exhibiting hydrophobic behaviour. They exhibit a pronounced ability to bind a wide variety of cations or anions, often undergoing marked conformational changes during binding. Their hydrophobic exteriors allow them to solubilise ionic species in non-aqueous solvents.

The formation and thermodynamic stability of these macrocyclic complexes are effected by a number of factors including the types of binding sites in the ring, the number of binding sites in the ring, the relative sizes of the ion and of the macrocycle cavity, the physical placement of the binding sites, steric hindrance in the ring, the solvent and the extent of salvation of the ion and the binding sites, the electrical charge on the ion, and the replacement of 0 groups within the ring with N groups or with S groups.

Crown ethers, cryptands and other macrocyclic ligands are also effective at complexing a variety of metal ions and may therefore be formulated to provide a very high degree of selectivity in metal binding. They may be directly incorporated into the superhydrophilic polymer as the macrocycle itself, or, they may be bonded to a silica, acrylic, cross-linked polystyrene or other substrate prior to their incorporation.

Other solvating agents which can synergistically assist in the salvation of the crown ethers include substantially water insoluble alcohols such as n-pentanol, n-hexanol, 2-ethylhexanol, isodecanol, dodecanol, tridecanol, isotridecanol, hexadecanol, octadecanol; phenols such as heptylphenol, octylphenol, nonylphenol and dodecylphenol or water soluble hydroxyl-containing reagents such as polyethylene glycol with a molecular weight varying from about 400 to about 20,000.

(2) Water Soluble Chelating or Coordinating Agents.

Chelating or coordinating agents include polymers capable of capturing metal species in a host-guest relationship such as by forming ionic bonds with the metal and displacing at least a portion of the ligands of the metal complex.

For example, polyethyleneimine (PEI) polymers and PEI-based polymers such as hydroxyethylated polyethyleneimines, are capable of capturing metal ions and displacing a cyanide ion associated with the metal. Incorporation of chelating agents, such as polyethyleneimine compounds and polyethyleneimine-based compounds into a superhydrophilic polymer will enable the metal ions to be displaced from the cyanide ions enabling the ligands to continue to act as a lixiviant. Methods for incorporation of hydroxyethylated polyethyleneimines into the superhydrophilic polymer will be discussed herein.

Preferably, the PEI polymer includes primary, secondary, tertiary and may include quaternary amine functionality. Water soluble polymers should preferably maintain their solubility over the pH range of 1–14. In addition to PEI polymeric backbones, other nitrogen-containing water soluble amines, such as polymer poly(allylamine) or poly(vinyl alcohol) may be considered. Alternatively, oxygen and/or sulphur groups may be incorporated into the polyimine structure.

Water soluble polyethyleneimine-based polymers (PEI) have been proposed for the displacement of copper and other metals from their cyanide complex in U.S. Pat. No. 5,643,456 and which is specifically incorporated by reference. However, this patent fails to appreciate that the displacement reaction is a reversible or equilibrium reaction and, as such, must be forced in the forward direction by removal of the free cyanide ions from the aqueous solution (Le Châtelier's principle) otherwise the displacement reaction will not go to completion.

Thus, according to a particular embodiment of the present invention there is provided a process for the recovery of metal species from a solution or slurry containing metal cyanide species, comprising the steps of:

a) contacting the solution or slurry with a water soluble polymeric chelating or coordinating agent preferably containing sodium benzoate to load the water soluble polymeric agent with the metal species;

b) separating the loaded water soluble polymeric agent by membrane separation such that cyanide is displaced and reports in the permeate and complexed metal species reports in the retentate;

c) recovering the metal species from the retentate; and optionally d) recirculating the cyanide-rich permeate from step b) and/or water soluble polymeric agent-rich solution following step c).

It is preferable that if any free cyanide exists in the cyanide aqueous stream, for example copper cyanide aqueous stream, that it is removed by membrane separation prior to the introduction of the water soluble polymeric agent, for example as referred to hereafter the PEI-based polymer. This removal step will have the added advantage of reducing the volume of solution to be treated for copper cyanide removal. The permeate will then contain the free cyanide ions (and be immediately available for recycle) and the retentate will contain the copper cyanide ions in a reduced volume of water. A suitable membrane would be of the types described in, for example, U.S. Pat. No. 4,741,831, U.S. Pat. No. 4,770,784, U.S. Pat. No. 4,895,659, U.S. Pat. No. 5,266,203 and U.S. Pat. No. 5,643,456. The PEI-based polymer may then be introduced into the copper cyanide retentate solution and thus become the feed for the second membrane cartridge. Therefore, this second membrane cartridge may be considered as a "displacement reactor" in which the PEI polymer complexes with the copper and the cyanide ions are displaced. The cyanide ions then report in the permeate and the complexed copper reports in the retentate. Ultrafiltration or nanofiltration may be used to separate the metal imine complex from the cyanide ions as they are displaced from the metal cyanide complex. The metal ion is then released from the polymer by acidification as described in U.S. Pat. No. 5,643,456, or preferably by direct electrowinning in a suitably designed electrochemical cell as will be discussed herein.

It has now been discovered that if the metal ion is able to be reduced to its metallic state in an electrowinning cell, then the metal is able to be preferably recovered directly from the PEI-based metal ion co-ordinated complex by such electrolysis processes. With this in mind, the destruction of cyanide ions which would occur if these ions contact the anodic electrode should be considered. Thus, because the polymeric displacement solution leaving the membrane cell may still contain residual cyanide ions or metal cyanide complexes, it is desirable that an electrochemical cell incorporating a membrane be employed to maximise cyanide recovery and minimise cyanide destruction. Furthermore, U.S. Pat. No. 4,857,159 clearly identifies that metal cyanides which are among the most dangerous of chemical pollutants, are most often dealt with by destruction methods such as chlorination, electrolysis, solvent extraction and catalytic methods. They offer methods for recovering metals less dangerous than cyanides, but do not further address this toxic chemical. The methodology, the subject of embodiments of this invention serves to treat such cyanide-containing aqueous streams such that the cyanide can be economically recovered rather than destroyed.

An additional property exhibited by PEI's, namely their ability to coat the surface of a gold particle, thereby reducing the dissolution kinetics is considered by the invention. As little as 5 ppm of PEI can inhibit gold dissolution in oxygenated alkaline cyanide solutions. Thus, this important discovery clearly identifies the need to remove any PEI from any solution which is intended to be recycled within a gold plant. This requirement is further addressed herein.

Thus, in a preferred separation mechanism, free cyanide ions and a proportion of the water may be removed from the feed solution by membrane separation prior to the introduction of the PEI-based polymer. This cyanide-containing solution can be directly returned to the milling and/or leaching circuits. A more concentrated feed solution is then available for metal ion separation and recovery of all desirable ionic species.

Alternatively, the cyanide ions passing through the membrane walls can then either be destroyed or preferably recovered and recycled by known methods. Such methods include direct recycle, ion exchange concentration and/or membrane concentration such as described in U.S. Pat. Nos. 4,895,659 and 5,266,203 and which are specifically incorporated by reference. As reported herein, the removal of all PEI from this recycle stream must be accomplished before any solutions containing cyanide ions are recycled. Affinity dialysis for the economic separation of copper and cyanide ions from copper cyanide complexes forms part of the proposed applications for this discovery.

It is contemplated in this invention that two or more polymers or reagents capable of forming metal complexes may be used in combination. Thus, a low molecular weight polyamine derivative may be combined with a high molecular weight PEI-based complex. Each metal ion scavenger may be capable of complexing with different metal ions present in the feed solution. Then, by selection of a membrane with suitable pore size, desired complexes could pass through the membrane (permeate) and other metal complex retained (retentate) so that a separation of two or more metals could be achieved.

Alternatively, if the pore size of the selected membrane was such that both polymers were retained, then the opportunity to remove additional metal ions from a stream is enhanced.

(3) Water Insoluble Chelating or Co-Ordinating Agents

In particular instances, it is preferable that water insolubility be imparted to the PEI or the PEI-based complex. This may be conveniently conducted by reaction of the PEI or an ethoxylated PEI nitrogens with acyl or alkyl halides such as $C_7$ to $C_{18}$ halides and including hexyl iodide and tetradecyl iodide forming tertiary and quaternary nitrogens, or by methods described in U.S. Pat. Nos. 3,715,339, 4,537,937, 4,578,195 which are specifically incorporated herein by reference. The degree of alkylation will influence the degree of hydrophobicity. Such water insoluble, PEI-based co-ordinating polymers, may be formulated to provide solubility in organic solvents. Typical of such solvents are the aliphatic and/or aromatic-containing kerosene fractions such as Shell Chemical's Shellsol 2046 or Exxon Chemicals Escaid 100. This enables the favourable properties exhibited by PEI-based polymers to be used in solvent extraction applications.

The PEI, or modified PEI, may alternatively be modified such as by the addition of a pendant pyridine or other group in conjunction with alkyl amine groups as described in U.S. Pat. No. 4,741,831 and which is incorporated herein by reference. An ethoxylated PEI may have the pendant hydroxyl groups reacted to either fix the polymer to a solid support or to add a long chain hydrocarbon-based molecule to render the PEI water insoluble. PEI polymers may also be quaternised as described in U.S. Pat. No. 5,087,359 and incorporated herein by reference.

Additionally, polymer backbones other than the PEI-based structure as disclosed and which are well-known to those skilled in the art, are contemplated to form part of this class of water insoluble polymers.

Thus, according to a particular embodiment, the invention provides a process for the recovery of metal species from a solution or slurry containing metal cyanide species, comprising the steps of:

a) contacting the solution or slurry with a water insoluble polymeric chelating or coordinating agent to load the water insoluble polymeric agent with the metal species;

b) separating the loaded water insoluble polymeric agent by either solid/liquid separation or liquid/liquid separation such that cyanide is displaced and reports in the aqueous phase and complexed metal species reports in the solid phase or the organic phase;

c) recovering the metal species from the solid or organic phase; and optionally d) recirculating the cyanide-rich solution from step b) and/or the solid or the water insoluble polymeric agent-rich solution following step c).

Solid, Polymeric Materials

The polymeric materials used for incorporating the capturing or displacing agents are preferably foamed and the degree and nature of any such foaming of the polymeric material may be conducted using surfactants and/or defoaming in the reaction mixture for forming the polymeric material. Polyurethane formulations exhibiting superhydrophilic properties are the preferred polymeric materials.

Conventional polyurethane foams and resins are manufactured by the reaction of a polyol with an isocyanate in the presence of catalysts, silicone surfactants, water, and possibly a secondary blowing agent, dyestuffs etc. The polyols are normally glycerine-based triols reacted with propylene oxide. Up to about 20% of ethylene oxide may be incorporated into the polyol to provide either primary hydroxyl groups for increasing the reactivity of the system, or to modify the hardness of the finished foam. TDI is the usual isocyanate, although MDI and other isocyanates are used to modify the system. Up to 5 parts of water per 100 parts of polyol is included in the formula to react with a portion of the isocyanate to generate carbon dioxide and cause the polymer to expand. In contrast to the hydrophilic polyurethanes, these conventional polyurethanes are more or less hydrophobic.

The first disclosure of a superabsorbent polyurethane-based foam was the Wood disclosure in U.S. Pat. No. 3,812,619. These superabsorbent, hydrophilic polyurethane polymers are chemical entities which are well known to those skilled in the art. Methods for their preparation or for their application are typically described in U.S. Pat. Nos. 3,793,241; 3,854,535; 3,861,993; 3,890,254; 3,900,030; 3,903,232; 3,904,557; 4,110,508; 4,127,516; 4,137,200; 4,158,087; 4,160,076; 4,181,770; 4,266,043; 4,292,412; 4,314,034; 4,365,025; 4,337,645; 4,384,050; 4,384,051; 4,717,738; 4,725,628; 4,731,391; 4,740,528; 4,789,720; 4,798,876; 4,828,542; 5,065,752; 5,065,752; 5,296,518; 5,591,779 and 5,624,971 incorporated herein by reference.

The procedure for the manufacture of the prepolymers described in the above patents is either given within the description, or can be produced according to typical procedures as described in various publications relating to polyurethane chemistry, or as disclosed in U.S. Pat. Nos. 2,726,219; 2,948,691; 2,993,013; 3,805,532; 4,137,200.

The high concentrations of water employed in their manufacture enable high quantities of wet materials to be incorporated into the finished polymer. The very low viscosity of water enables much higher loadings of solid material to be incorporated into the final product. Thus, chelating or co ordinating agents and/or solvating agents may be dispersed at a suitable concentration in water, any additional reagents added and the aqueous mixture then reacted with the prepolymer to obtain the final product.

Incorporation of the MRT or the PEI products into the superhydrophilic polymers may be by direct incorporation into the aqueous phase. To maintain the capture properties of the particular material, copper ions may be incorporated into the aqueous phase together with copper-selective MRT material if it is desired to use the MRT-containing polymer for the capture of copper ions. In the case of the PEI polymer, if capture of WAD cyanides is desired, then again the introduction of copper ion into the aqueous phase is desirable. The water phase containing the MRT or the PEI material, together with any surfactant, catalyst, alcohol, thickening agents, etc. is then blended with the prepolymer to obtain the desired compound. Additionally, some of the free NCO groups present in the prepolymer can undergo a chemical reaction with some of the imine groups present in the PEI to render them less water soluble.

MRT-based capturing agents when used for the capture of metal ions are generally bonded to a solid substrate. As such, the final product is small in diameter so as to provide sufficient ligand activity capacity to achieve a satisfactory loading capacity. Incorporation of these MRT-based capturing agents into a superhydrophilic polymer provides these particles with sufficient physical properties and particle size to enable them to be used in slurry applications for which the MRT-based capturing agents have not been previously suitable.

Therefore, the macrocyclic ligands may be directly incorporated into the superhydrophilic polymer as the macrocycle itself, or, may be bonded to a silica, acrylic, or other suitable substrates prior to incorporation.

PEI-based polymers may be bonded to solid supports such as described in U.S. Pat. No. 5,695,882 and U.S. Pat. No. 5,997,748 which are specifically incorporated herein by reference. These solid, functional materials may be directly incorporated into superhydrophilic polyurethane-based polymers to increase their particle size, assisting in their recovery from aqueous solutions. Alternatively, they may be directly employed to sorb the copper and displace the cyanide. Such modified PEI's are further described in the Examples.

PEI-based water soluble polymers may also be adsorbed onto solid supports such as polyurethane-based resins, styrene-divinyl resins, and activated carbon and coated with a suitable formulated superhydrophilic polyurethane formulation as discussed above. Furthermore, PEI polymers may be adsorbed onto a cationic ion exchange resin or a hydrophilic or a hydrophobic macroporous resin bead. Cationic metal complexes such as positively charged copper-chelated-PEI polymers are capable of being formed and retained on the ion exchange resin sites incorporated into the superhydrophilic polyurethane compound.

If these particular compounds are incorporated into a superhydrophilic polymer as disclosed in PCT/AU98/00811 which is specifically incorporated by reference, then a polymer is able to be produced which can be directly introduced into either a slurry or into solutions for the purpose of recovering the desired metal ion or ions. Thus, for example, if the copper cyanide complex is desired to be removed from solution, a crown ether with the requisite hole size to capture copper may be incorporated into the superhydrophilic polymer. The copper will be selectively recovered from the slurry or solution, and depending upon the ionic strength of the solution, freeing the cyanide ion for return to the leach circuit. The copper ions can then be recovered by methods such as acidification, salting out, then followed by precipitation, electrowinning, or other method well known to those in the gold industry.

Thus, the superhydrophilic polyurethane containing the chelating or coordinating agent and/or solvating agent may be incorporated into a suitable polymeric formulation. In a preferred embodiment, the superabsorbent polyurethane and the chelating agent and/or solvating agent may be disposed within the cells or the cell walls of an open cell (non-superhydrophilic) polyurethane foam. The stiffness of the open-cell polyurethane foam provides the desired mechanical properties, whilst the metal ion recovery properties are provided by the superabsorbent polyurethane-based composition.

The solid and liquid chelating or coordinating materials of the present invention may also be directly incorporated into a suitable polyurethane foam formulation, foamed and cured. If required, a superhydrophilic polyurethane foam with or without additional or different additives can then be applied to the polyurethane foam and cured. Thus, the desired stiffness of the finished product is achieved without a significant loss in polymer performance.

Polymeric materials based upon superhydrophilic polyurethanes may be low in loadbearing properties, that is lack stiffness, and may swell to an excessive extent when immersed in water. This may render them unsatisfactory, or difficult to recover by conventional screening operations when used in slurry applications. This potential problem can be readily overcome by the addition of stiffening agents to the material during its manufacture. These stiffening agents may include, for example, inorganic or polymeric fibres, cellulose-based paper, either woven or non-woven cloths, felts, foamed materials such as polyurethane foams or cellulose foams, or similar agents.

Hydrophilic polyurethane-based membrane materials are well known. These products can be produced in both aqueous, and non-aqueous solvents and as such, can be applied to the surface of the superhydrophilic polyurethane by imbibing the material in a suitable solution of the membranous material and cured at room or elevated temperature. If the hydrophilic polyurethane formulation is already crosslinked or cured, then it may be imbibed as before and then the solvent may be removed by evaporation.

Application Procedures

As stated, the polymeric materials of the present invention are capable of capturing and thereby recovering desired metal values from aqueous solutions and slurries. The metal values may be in the form of cations, anions, or metal complexes. In capturing a metal ion, the associated counter ion may be released back into the leach solution and/or slurry, enabling it in certain processes to be able to continue to act as a lixiviant. Alternatively, if it remains associated with the metal ion, then it is able to be readily eluted from the polymer. Preferably, the polymeric materials are used in a cyclic process.

While these processes are intended to be used in the recovery of precious, and related metals, it is not confined to those metals. For example, it is envisaged that certain of the polymers could be readily used in acid mine drainage applications to concentrate say a copper ion for a subsequent electrowinning process.

The preferred lixiviants to be used in the gold mining industry are either cyanide-based or thiosulphate-based. Thus, the metals of interest for recovery are those which form strong complexes with cyanide and include gold, silver, copper, zinc, iron, nickel, cadmium, mercury and cobalt, or the gold, silver and copper thiosulphate complexes.

With these lixiviants, it is desirable to recover the metal complex from a slurry using a solid/liquid system. However where clear solutions are generated such as in heap, vat or dump leaching, either liquid/liquid extraction or solid/liquid extraction methods may be adopted.

The removal or recovery of metal species from slurries by the application of a solid sorbent, such as the recovery of gold cyanide using coarse particles of activated carbon, is an important aspect of mining operations. Activated carbon adsorbs the gold cyanide anion and may be recovered directly from the slurry by simple screening. This obviates the need for the separation of the gold-containing solution from the leached gangue minerals as was required in the earlier cementation gold recovery process. The process is known as the carbon-in-pulp (CUP) or the carbon-in-leach (CIL) process. Ion exchange resins have been substituted for activated carbon and the process has been renamed as the resin-in-pulp (RIP) process.

In these processes activated carbon suffers from poor resistance to attrition, slower loading kinetics than ion exchange resins thereby increasing the volumetric capacity of the carbon loading circuit, the activated carbon requires a thermal regeneration step, also loads calcium and magnesium ions leading to pore blockings, and sorbs organic matter from solution also leading to decreased loading capacity.

Whilst carbon has its obvious disadvantages, commercially available ion exchange resins have not been widely adopted as an alternative method for the recovery of gold cyanide. This is largely attributed to their small bead size. PCT/AU98/00811 which is incorporated herein by reference offers one method for overcoming this particle size deficiency without loss in either kinetics of loading and stripping or in ultimate useful loading capacity.

Thus, the solid polymeric materials, disclosed in this application, may be conveniently used as an alternative to activated carbon in the well known RIP process, or in conjunction with activated carbon to target a specific metal ion and in particular, copper, or following the CIP or CIL circuit for the recovery of all remaining cyanide-soluble metal ions. The particles of polymeric materials produced in this process are of sufficient size to replicate the size of activated carbon, or if required, larger than commercially available activated carbons so that they can be easily recovered from slurries by conventional screening operations.

Cyanide metal complexes can be divided into weak (copper, zinc, nickel and silver) and strong (iron (II), iron (III), cobalt and gold) according to their stability. The term "weak acid dissociable cyanide" (WAD) includes free cyanide and the weak complexes (particularly those of copper and zinc) but not the iron complexes. Alternatively, if these metal cyanide complexes are not adsorbed onto the activated carbon present in the leach or slurry, they are lost to tailings. This results in the loss of the cyanide lixiviant and increases the concentration of cyanide in the tailings water. WAD cyanide species are relatively stable complexes and thus are recognised as being undesirable from an environmental standpoint. Minimisation of their concentration is being mandated in many mining districts and in some instances has led to mine closure or the prevention of the commencement of mining operations. Free cyanide concentrations above 0.2 ppm can kill sensitive species of fish in fresh water and in marine environments which indicates that even in very low concentrations cyanide can be environmentally very detrimental. Regulatory authorities are now legislating to ban the release of water into tailings darns containing more than 1 to 2 ppm of free and WAD cyanide.

If free cyanide present in the slurry is required to be recovered, the polymers as described in PCT/AU98/00811 with amine functionality and particularly with quaternary amine functionality may be employed. Additional copper or zinc ions may be added to complex the free cyanide, or polymer having copper and/or CuCN adsorbed on its surface is employed so as to convert the insoluble CuCN to its higher cyanide-containing soluble complexes. Elution of the copper cyanide may be achieved using a high pH (preferably NaOH), eluent solution probably containing additional NaCN and with controlled redox potential, possibly with added sodium benzoate, a thiocyanate, an acrylic based polymer and/or a PEI-based polymer. The eluent solution may be at a temperature of 25–60° C. and may be deficient in oxygen. The copper cyanide solution preferably containing sodium benzoate can then be further concentrated by contact with the PEI polymer enabling the alkaline cyanide solution to be passed through a membrane and returned to the leach circuit. Preferably, the copper is directly recovered from the PEI-containing eluent solution by electrowinning. Alternatively, the polymer is then acidified to displace the captured copper ions and the copper is won by electrowinning, or by sulphurising with sodium sulphide, NaSH, etc. to obtain the copper sulphide compound.

If in a gold plant it is desired to recover all of the WAD cyanide species, it is preferable that PEI-based polymers are employed to capture all of the metal ions and release all of their associated cyanide ions. The water soluble PEI polymer, or PEI-based polymer, may be added to clarified solutions or ion exchange polymer strip solutions at the end of the circuit, or into additional contactors so that all of the metal ions forming the WAD cyanide species are captured and all of the cyanide released. The metal ions and the cyanide ions may then be separated by membranes and the free cyanide returned directly to the leach circuit. Elution of the PEI polymer, preferably with hydrochloric acid will then recover all of the gold and other contained metal species. Sodium borohydride, for example, or electrowinning, may then be employed to recover the gold from the chloride solution. If additional metals are present and complexed with the PEI polymer, then preferably, electrowinning techniques are employed to recover the metal species.

This disclosure provides methods by which the removal and recovery of both the metal complex and the cyanide ions can be economically achieved, enabling the environmental issues surrounding the use of cyanide to be addressed. Thus, the cyanide can be retained within the plant so that it does not enter tailings impoundments. As such, this discovery therefore has significant environmental importance.

If it is desired to remove all cyanide species from gold cyanide during the leaching of say a copper-gold ore, this can be readily achieved by the application of an MRT-based polymer in which the macromolecule is sized to capture copper. The MRT-based polymer beads which are sized to be larger than that of the activated carbon, are added together into the contactors in the CIP/CIL circuit. The activated carbon will load the gold cyanide and the MRT polymer will capture the copper ions, displacing the cyanide ions and allowing them to continue to leach further metal. On completion of the contact period, both the activated carbon and the MRT polymer will be screened preferably using a double-deck screen. The carbon will be recovered on one screen size, the MRT polymer will be recovered on the larger screen deck. Each material will then be separately sent for stripping of their respective metal ions.

Any cyanide which accompanies the polymer when it is recovered from the solution or from the slurry, can be easily eluted from the polymer under alkaline conditions and avoid the formation of HCN. This enables the removal of all metallic ions from the metal cyanide complexes and the recovery or reuse of the cyanide ion without the loss of these more stable WAD cyanides to the environment, or the possible formation of HCN. After recovery of the polymer particles, they are washed to ensure no residual cyanide is present and then acidified for the release of the metal ions into solution. The metal ions can then be recovered by methods such as precipitation, cementation, electrowinning, or other method well known to those in the gold industry.

The presence of an alcohol, particularly a water insoluble alcohol, may enhance the sorption properties of both the polymeric materials and also that of the water insoluble polymeric materials. In the preparation of the superhydrophilic polyurethane-based polymers, the alcohol can react with part of the free NCO groups present in the prepolymer to increase the density of the final product. It is understood that the term alcohol also includes phenols and organic molecules containing the —H moiety. It will be understood that the term "substantially insoluble" means the alcohol is insoluble in the lixiviant solution although a small amount or insignificant amount of the alcohol may dissolve in the lixiviant solution. Suitable alcohols include n-pentanol, n-hexanol, 2-ethylhexanol, isodecanol, dodecanol, tridecanol, hexadecanol, octadecanol; phenols such as heptylphenol, octylphenol, nonylphenol and dodecylphenol. Preferably the alcohol is a non-aromatic alcohol. The preferred non-aromatic alcohols include pentanol and isotridecanol. These alcohols may be imbibed into solid polymers exhibiting ion exchanging, ion capturing and ion displacement reactions to solvate the ligand sites already present within or on the surface of these materials.

Solubility modifiers such as organo-phosphorus compounds including tributyl phosphate (TBP), dibutylbutyl phosphonate (DBBP), di- and tri-(2-ethylhexyl) phosphate may also be incorporated into the formulation. Dialkyl phosphorodithioic acids, phosphonates, sulphur-containing methyl phosphonates, ketophosphonates, and trialkyl thiophosphates for example, are also able to be considered. It is suggested that these reagents probably act by solvating an electrically neutral ion association complex. These compounds may be imbibed into solid polymers exhibiting ion exchanging, ion capturing and ion displacement reactions to solvate the ligand sites already present within or on the surface of these materials.

If clarified solutions are available and which contain metal cyanide complexes, particularly copper cyanide, then either water soluble or water insoluble PEI-based polymers can be used to chelate or co-ordinate with the copper and displace the cyanide. Membrane separation is employed with the water soluble PEI polymers to separate the cyanide ions (permeate) from the chelated copper (retentate). The cyanide-containing solution should be contacted with an absorbent capable of removing any residual PEI-based polymer prior to its recycle within the gold hydrometallurgical plant. This may be accomplished using sorbents which do not adsorb cyanide and include perlite, vermiculite, and other inexpensive materials. Waste rock dumps could serve such a purpose. The copper can then be directly recovered from the water soluble chelator by direct electrolysis.

Alternatively, if water insoluble extraction systems are employed, the cyanide ions will remain in the aqueous phase and the chelated copper will remain in the organic phase. Additives such as solvating agents as previously described, my form part of the water insoluble organic phase. Nonyl phenol, for example, if included in this formulation will aid in modification to the counter ion charge on the PEI-based polymer. Other modifiers include DBBP, TBP, and water insoluble alcohols as described herein. The copper is stripped from the organic phase by acidification and the metal recovered by electrowinning. Attempts have been made to electrowin the copper directly from the polymer and under selected conditions may be achievable.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The present invention will now be described with reference to the following non-limiting examples.

EXAMPLES OF METHODS FOR THE PRODUCTION OF THE ION CAPTURING OR ION CHELATING POLYMERS

1. Superhydrophilic Prepolymer

A hydrophilic prepolymer "Prepolymer" was prepared by reacting together a 1000MW poly(oxyethylene) glycol with toluene diisocyanate to produce an isocyanate-terminated prepolymer with a free NCO content of 9.5.

| | |
|---|---|
| PEG 1000 | 100 pbw |
| TDI | 44 pbw |
| MDI | to provide NCO content of 9.5% |

The prepolymer was prepared by Orica Australia Pty Ltd. under the product code of Modified Suprasec PA40/2.

2. Typical Method for Manufacture of Solid Superhydrophilic Ion Capturing and Ion Exchanging Polymers (a) Into a suitable mixing container was added:

| | |
|---|---|
| Separan solution (1% in water) | 25 g |
| Pluronic L62 | 1.0 g |
| MRT resin | 25 g |
| Dyestuff | as required |

The ingredients were thoroughly mixed together and then poured into a second container containing 50 grams of prepolymer (Modified Suprasec PA40/2).

The contents were then poured into a mould the surface of which had been treated with a release agent and which was pre-lined with a cellulose fibre (tissue paper) and a fine cotton fabric. A second layer of cotton fabric was applied to the upper surface of the foaming mixture followed by a layer of cellulose fibre (tissue paper). The mould was closed and the polymer allowed to cure. It was then removed, cut to size and used in the experimental procedures given below.

(b) In the examples in which a high molecular weight, water soluble solvating agent was used, the following procedure was adopted.

| | |
|---|---|
| Styrene-divinyl benzene resin (XAD-16 milled) | 10 g |
| Water soluble PEI | 10 g |
| Polyethylene glycol 1000 | 2 g |

The solid resin and the organic extractant were combined together and heated to about 35° C. with constant stirring. Once the extractant was fully imbibed into the resin, the PEG1000 was added and stirring continued. A dry powder was obtained.

In other examples, the following powder formulation was prepared:

| | |
|---|---|
| Styrene-divinyl benzene resin (XAD-16 milled) | 10 g |
| Water soluble PEI | 10 g |
| Isodecanol | 2.5 g |
| Polyethylene glycol 1000 | 2 g |

In this instance, the isotridecanol was fully impregnated into the polystyrene divinyl benzene resin before the PEG 1000 was added.

This powder was then mixed with the following:

| | |
|---|---|
| Powder | 15 g |
| Water | 20 g |
| Pluronic L62 | 0.75 g |

To this mixture was added:

| | |
|---|---|
| Prepolymer | 20 g |

The mixture was then poured into a mould prepared as described above.

(c) Water insoluble PEI-based extractant:

Hexyl iodide was reacted with Lupasol P (a high molecular weight polyethyleneimine manufactured by BASF Limited) to produce a water insoluble polymer dispersed in a water-based emulsion.

The emulsion was then reacted with the Prepolymer as follows:

| | |
|---|---|
| Emulsion | 20 g. |
| Cithrol 4MO | 0.5 g. |
| Triethylamine | 0.5 g. |
| Prepolymer | 20 g. |

The emulsion component was rapidly mixed with the prepolymer and poured into a preprepared mould as described in Example 2. When cured, the product was evaluated in acid mine drainage examples.

3. Impregnated Polyurethane Foam-Based Polymers.

Lupasol P, a high molecular weight polyethyleneimine, was absorbed into pieces of a flexible hydrophobic polyurethane foam which had been cut to a suitable size.

A water-based blend was prepared as follows:

| | |
|---|---|
| Water | 40 g. |
| Cithrol 4MO | 1.0 g. |
| Triethylamine | 0.5 g. |

This was rapidly stirred with 20 g. of the Prepolymer and the impregnated cut foam was added and rapidly wet out with the mixture. The mixture was then poured into a large excess of water, mixed and allowed to cure.

4. Water Soluble Polyethyleneimine-Based Polymers

In the following industrial application examples, Lupasol P, a high molecular weight PEI was used.

5. Solid, Silica-Based, Covalently-Bonded PEI's

Silca-based particulates onto the surface of which polyethyleneimine (with and without long chain poly (oxyethylene) spacer groups to provide additional PEI flexibility, were evaluated.

6. PEI Tethered to Inorganic Surfaces

A carboxy modified PEI polymer was prepared by the reaction of partial oxidation of hydroxyethylated PEI. Typically, only a ratio of carboxylic acid to PEI repeat units of 1:1000 is preferred.

(a) Titanium dioxide surfaces.

A high surface area titanium dioxide such as for example Degussa P25 is activated by heating it to 425° C. for 30 minutes in a dry atmosphere. On cooling the powder is then mixed with a solution of carboxy-modified PEI dissolved in ethanol. The carboxy-modified PEI rapidly reacts with the titanium dioxide surface to form titanate ester bridges tethering the PEI to the surface.

(b) Alumina.

A high surface area alumina is activated by heating it to 425° C. for 30 minutes in a dry atmosphere. On cooling the powder is then mixed with a solution of carboxy-modified PEI dissolved in ethanol. The carboxy-modified PEI rapidly reacts with the titanium dioxide surface to form titanate ester bridges tethering the PEI to the surface.

The above product examples were evaluated in a number of industrial examples as given below.

Non-limiting Examples for the Industrial Application of this Invention

1. Acid Mine Drainage

Waste rock containing sulphide minerals when exposed to weather conditions undergo oxidation due to air, sunlight and bacteria which leads to the eventual formation of sulphuric acid together with other constituents dissolved from the rock. These acidic, mineral-containing solutions are referred to as acid mine drainage (AMD). Depending upon the sulphide minerals present and the volume of water passing through the waste rock at any time, the solution pH and the metal ion concentrations can vary. Thus, recovery of the valuable metal ions, particularly copper, by ion exchange and solvent extraction processes is difficult and may release other contaminants such as kerosene to the environment and is non-selective for particular metals.

The copper ions present in the aqueous solution may be captured by incorporation of a copper-selective MRT compound into a superhydrophilic polymer. This MRT-based polymer will selectively capture all copper ions present in solution regardless of the solution pH. Thus, there is no requirement for solution pH adjustment and total selectivity of copper over all other cations is obtained. The copper can then be stripped from the MRT polymer and won using conventional electrolytic processes.

The application of the water soluble PEI-based polymer may similarly be used to precipitate iron and capture copper, cobalt, nickel and other water soluble metal ions which are capable of coordinating with the PEI polymer. The valuable metals may then be recovered preferably by direct electrolysis of the metal ion-containing polymer. If necessary, the metal-PEI complex may be concentrated by ultrafiltration or nanofiltration methods.

Acid mine drainage solution from the Mt. Lyell copper mine in Tasmania was contacted with the PEI polymer as given in Example 4. The copper present in the solution rapidly complexed with the PEI, turning the solution blue. The iron present in the solution precipitated to form a filterable product.

The solution was passed through a sand filter to remove the precipitated iron and the co-ordinated copper PEI complex was then pumped through a membrane to concentrate the copper complex. This complex was then passed to an electrowinning cell to recover the copper. The copper-depleted PEI complex was then recycled.

This experiment was replicated using acid mine drainage from the Mt Morgan copper mine in Queensland. Again, the iron was removed and the copper recovered.

In a further trial, the acid mine drainage solution from Mt. Morgan was contacted with the solid polymers described in Examples 2(b), 2(c), 5 and 6. In all cases, copper was removed from the solution, the iron remaining in solution. After removal of all of the copper, the solution was rendered alkaline to precipitate iron hydroxide. This method enabled the copper to be recovered without loss during any precipitation reaction.

In a further trial, a hydroxyethoxylated PEI (Lupasol SC manufactured by BASF Limited) was added to the acid mine drainage solution from Mt Morgan. Both the copper and the iron were complexed, and even under alkaline conditions, both metals remained in solution and were able to be removed from solution by membrane separation; the copper and iron being in the retentate, the metal ion free water being in the permeate. This provides a method for the removal of all ions from solution.

The addition of polyethylene glycol 1000 to the Mt. Morgan acid mine drainage in the presence of the PEI in Example 4 enabled the iron to remain in solution and the copper to complex with the PEI. Again, separation of both metal ions could be achieved and enabling the copper to be recovered by electrolysis.

2. Copper-Containing Ores

Oxide copper ores are often treated with dilute sulphuric acid solutions to dissolve copper as soluble copper sulphate in vat or heap leaching operations. The copper is then recovered by conventional solvent extraction and electrowinning processes. This method is not suitable for the treatment of copper sulphide minerals or ores which contain acid consuming minerals such as dolomite. Thus, as proposed in U.S. Pat. No. 3,189,435, U.S. Pat. No. 3,303,021, U.S. Pat. Nos. 3,791,817, and 4,587,110, sodium cyanide under alkaline conditions can be considered as an alternative lixiviant for both copper sulphide and copper oxide ore types. Polyethyleneimine-based polymers have been discovered to be capable of leaching copper from these ores. Their addition to a lixiviant solution may aid in improving the copper recovery and/or the leach kinetics.

Copper ore from the Ernest Henry mine in Queensland was contacted with the PEI polymer described in Example 4. Copper was dissolved and chelated with the PEI polymer.

Copper cyanide is not readily recovered using activated carbon. Thus, ion exchange resins have been promoted for the recovery of metal cyanide complexes, particularly copper cyanide. Existing cyanide leaching processes all suffer from one or more of the following problems, namely of small bead size if conventional ion exchange resins are employed to recover the copper cyanide; the hazards associated with handling the highly toxic HCN if acidification processes are adopted to recover the copper by electrowinning processes; the potential loss of cyanide or copper metal if acidification is adopted; the handling of toxic $Na_2S$ or NaSH together with the difficulties associated with the recovery of finely divided $CU_2S$ if the copper is recovered as copper sulphide. As will be shown in this example, the copper displacement and cyanide recovery reactions are conducted under alkaline conditions overcoming all of the above objections.

If gold is associated with the copper in an ore, U.S. Pat. No. 5,961,833 proposes that membrane-based technology may be used to separate the gold cyanide from copper cyanide. Again, the problems associated with the downstream handling of copper cyanide is not addressed by this disclosure.

To overcome these difficulties, if the copper cyanide is generated in slurries, then the application of MRT- or PEI-based polymers as proposed in this application will enable the copper ions to be directly recovered from the slurries. Ion exchange technology as described herein can then be employed to recover the residual cyanide for reuse. If clarified solutions are obtained as is the case in vat and heap leaching operations, then again, the application of the MRT- or PEI-based polymers will directly capture the copper ions and enable the residual cyanide solution to be directly returned to the heap or vat for further lixiviation of copper and gold. Any gold cyanide in solution can then be recovered by ion exchange or activated carbon methods as is well known in the gold mining industry. Alternatively, PEI-based superhydrophilic polymers may be employed to capture the copper in a manner similar to that described for the MRT-based superhydrophilic polymers. Similarly, the PEI-based polymers covalently bonded to inorganic supports as disclosed in Examples 5 and 6 in a similar manner can be used to recover the copper and displace the cyanide. This is particularly able to be achieved if an ethoxylated spacer unit is bonded to the inorganic support so as to enable the PEI chain to be able to move more freely. Such PEI-based polymers can be functionalised using pyridine, quinoline, or other functional group specifically identified by this invention or quaternerised to render the polymer capable of recovering anionic species.

If either copper cyanide or residual cyanide (precomplexed with zinc or preferably copper) is preferred to be recovered by ion exchange technology, then polymers based upon tertiary and/or quaternary amines, guanidines, or according to Examples 5 and 6, etc may be employed to recover the copper cyanide. A preferred form of these ion exchange polymers is as disclosed in PCT/AU98/00811. These ion exchange polymers are then stripped of the copper cyanide using a high pH solution at temperatures of up to about 60° C. and containing additional stripping aids which include the PEI-based polymers described herein and which may also include sodium benzoate, polyacrylic acids, thiocyanates, etc. The resultant strip solution is then passed through an ultrafiltration unit to separate the free cyanide of return to the leach circuit. If desired, one or more, membrane units of different configuration may be employed to separate the balance of the stripping reagents from the cyanide. Preferably, the copper may be directly recovered from the PEI-containing stripping solution by electrowinning processes. Alternatively, the PEI-based polymer may be acidified to release the copper ions. These copper ions are then recovered as copper metal in electrowinning cells. If desired, additional copper ions may be included in the acidified solution so that the current efficiency of the electrowinning cells is maintained. Such methods are well known to workers in the copper recovery and refining industries.

When clarified metal cyanide solutions are available, the application of water soluble or water insoluble polymer technology as previously described within this invention, represent preferred methods for the recovery of the metal and the displacement and recycle of the cyanide solution.

A copper-based ore was leached with sodium cyanide and the solids removed to give a colourless copper cyanide solution. When the PEI described in Example 4 was added to the solution, it satisfactorily complexed the copper as evidenced by the rapid change to a blue colour and accompanied by an increase in solution conductivity. The chelated copper complex was separated using a membrane cell and the retentate containing the copper complex was passed to an electrowinning cell. In this cell, lead sheet was used as the anode and a stainless steel sheet for the cathode. At approximately 1.9V and a current density of 50 amps/meter$^2$, a smooth deposit of copper was obtained on the cathode. The solution was plated down to a pH of 2.6 at which, the solution was still stable. The PEI was then recycled.

A copper-based ore was leached with sodium cyanide and the solids removed to give a colourless copper cyanide solution. When the PEI described in Example 4 was added to the solution together with 0.5% of sodium benzoate, it satisfactorily complexed the copper as evidenced by the rapid change to a blue colour and accompanied by an increase in solution conductivity. The chelated copper complex was separated using a membrane cell and the retentate containing the copper complex was passed to an electrowinning cell. In this cell, lead sheet was used as the anode and a stainless steel sheet for the cathode. At approximately 1.9V and a current density of 50 amps/meter$^2$, a smooth deposit of copper was obtained on the cathode. The solution was plated down to a pH of 2.6 at which, the solution was still stable. The PEI and the sodium benzoate were then recycled.

3. Copper/Gold Heap Leach/Vat Leach Operations

In these operations, clarified solutions are obtained containing both copper cyanide and gold cyanide. If activated carbon is used to recover the gold cyanide, some copper cyanide is also recovered but generally, copper cyanide is not adsorbed and thus concentrates in the tailings water. Therefore, copper cyanide concentrations in the tailings impoundment tend to increase with time. This can lead to high cyanide usage, increased cyanide addition to the leach solution to maintain the desired free cyanide concentration, additional cyanide loss by decomposition, reduced carbon adsorption efficiency, increase in carbon stripping frequency, larger carbon inventory, possibly a separate cold solution strip to remove the copper cyanide and high copper in the gold dore metal (possible refining penalties and the cost of insuring copper when the gold is dispatched to the gold refinery).

This copper can be readily recovered by the application of the proposed MRT-based superhydrophilic polymers. These polymers capture the copper ions leaving behind the gold and the free cyanide. The gold can then be recovered by conventional methods and the free cyanide is returned to the leaching operation.

The copper was selectively recovered using the solid polymer prepared using the method described in Example 2(a). Similarly, the PEI-based polymers prepared according to Examples 2(c), 3, 5 and 6 when evaluated for the copper recovery, all performed satisfactorily. The cyanide was displaced and recovered separately using membrane separation methods.

Alternatively, the water soluble or the water insoluble polymer technologies the subject of this invention (such as disclosed in Example 4) and using the methods described in the previous example (Example 2), may be readily adopted in this instance.

4. Recovery of Free and WAD Cyanide From Tailings Slurries

Currently at least 12 known processes for cyanide destruction or recovery have been proposed, or used, in industrial and mining applications. These processes include natural degradation, oxidation using electrolysis, various strains of *Pseudomona* bacteria such as *Pseudomonas paucimobilis mudlock* alkaline chlorination, ozone oxidation, activated carbon, ion precipitate flotation, ferrous sulphide adsorption/; ferrous sulphate precipitation, copper-catalysed hydrogen peroxide, and the Inco SO$_2$/Air process. Currently, the Inco process is the most widely adopted method for cyanide destruction. All of the above processes result in a loss of the cyanide reagent Furthermore, oxidation of cyanide to cyanates results in the formation of a compound which is toxic to aquatic life.

Recent reports would indicate that there is every likelihood that in the near future the discharge of thiocyanates into the environment may be banned or restricted by various EPA authorities. The Inco SO$_2$/air cyanide destruction method for example does not destroy thiocyanates and in fact, generates thiocyanates; so this process may not satisfy future discharge requirements should EPA regulations restrict thiocyanate discharge levels.

As an alternative to cyanide destruction, for many years, attempts have been made to develop an economic method for the recovery of cyanide from tailings streams. These processes have generally been based on the direct Acidification-Volatilisation-Reneutralisation, (AVR) process, Cyanisorb Process (a variation of the AVR process), MNR/SART Process, ion exchange resin sorption and reverse osmosis or membrane-based systems. The AVR-type process is ore-dependent and therefore, is unlikely to receive wide acceptance. Ion exchange processes suffer from the same difficulties as found in the RIP process for gold cyanide recovery, namely, limitations due to bead size, osmotic shock, pore-blocking and relatively slow loading and stripping kinetics.

The Mills-Crowe process in which sulphuric acid was added to cyanide solutions to volatilise HCN gas at room temperature was the earliest of the acidification-volatilisation processes. The liberated gas is then adsorbed in a lime slurry. One mine which installed the process found that using sulphuric acid for acidification led to the formation of gypsum and when copper sulphide minerals were present in the ore, copper cyanide and copper thiocyanate precipitated throughout the plant causing a regular shutdown for cleaning the plant. This process does not destroy ferrocyanide or thiocyanates; these species must be precipitated by for example, the addition of copper or zinc ions to form double complexes.

From the 1930s to the 1950s various operators recovered cyanide by this process but only from clarified solutions.

CANMET in the 1970s modernised the process and renamed it as the AVR (Acidification, Volatilisation and Reneutralisation process). Again, the process was confined to clear solutions. However, greater than 99% removal of the total cyanide was achieved and with final effluents from the process containing 0.1 to 4.0 mg/l of total cyanide. By designing an AVR reactor containing plastic packing in both the sorption and the stripping towers is reported to have reduced the power requirements and was found to be a more efficient design. Power requirements are still high due to the requirement for the generation of large volumes of low pressure air. There is also a significant chemical cost due to the need to acidify all of the tailings and after volatilisation of the HCN, to reneutralise all of the tailings stream. Again, the precipitation of significant quantities of copper thiocyanate and calcium sulphate throughout the plant is seen as the limiting problem.

Ion exchange resins can sorb the cyanide ion and thus can be used to produce deionised water from wastewater. However, if the cyanide ion is contacted by an H-type cation resin and is acidified, HCN is liberated and the efficiency of the ion exchange resin is reduced. A sealed exchange column under negative pressure must be employed to ensure that in the event of such a reaction occurring, no toxic vapours would leave the system.

The use of an ion exchange process which removes cyanides and metal cyanide complexes by series adsorption on $SO_4^{2-}$ form and CuCN-form anion exchange resins has been proposed. Amberlite IRA-400 [Rohm & Haas registered trade name] in the sulphate form was used in the first column and in the CuCN-form in the second column for the removal of five cyanide. Following adsorption, the primary column was eluted using 1% sulphuric acid solution decomposing the metal cyanide complexes. This solution was then pumped through a column of Amberlite IRC-120 [Rohm & Haas registered trade name] a cation exchange resin, which adsorbed the metals, while the HCN solution passed through the column and was neutralised in a caustic solution to regenerate sodium cyanide. The second column was also eluted with 1% sulphuric acid and the metals were recovered from the cation exchanger by desorption with a brine solution. The Coltinari patent, U.S. Pat. No. 4,708,804 describes one preferred method for conducting an AVR-type cyanide recovery technique.

The major cost associated with these plants would appear to be the energy required to pass the air through the stripping tower for HCN volatilisation. The transfer of free HCN from a solution to air is related to its Henry's Law Constant and is liquid film limited. If low concentrations of cyanide exist in the tailings, then the cost of treating all of the tailings can render the process non-viable.

A potential problem associated with the AVR and Cyanisorb processes is the reaction between the sulphuric acid and any acid-soluble minerals present in some ores, for example, calcite or dolomite. Furthermore, should the ore contain copper, then copper cyanide will be formed. Under acid conditions, insoluble CuCN is formed and which will be lost to tailings. Or, if more highly acidic solutions are employed, the CuCN will disproportionate for form HCN, divalent copper and metallic copper; the metallic coper would then be lost to tailings. Residual cyanide in the tailings dam could then remobilise the copper cyanide or redissolve the copper to form copper cyanide. Thus, the process does not have universal application.

Investigation of copper-gold cyanide circuits has shown that the WAD cyanide being pumped to tailings is almost entirely as either the $[Cu(CN)_2]^-$ and the $[Cu(CN)_3]^{2-}$ species although in hypersaline solutions it has been reported that the dominant species is $[Cu(CN)_4]^{3-}$. Samples drawn from these tailings at the point of discharge indicated concentrations of WAD cyanide of up to 1000 ppm. To recover these cyanide complexes and to overcome the difficulties associated with the various process discussed above, a strong base-containing superhydrophilic polymer in particulate form was contacted at the rate of 20 g/l with the tailings slurry for sufficient time to adsorb all of the WAD cyanide. The loaded polymer particles were recovered form the slurry by screening, transferred to an elution column where it was washed with two bed volumes of water and the copper cyanide was then eluted at 50° C. with a 2% NaOH solution containing an effective amount of sodium benzoate to promote stripping. Sufficient high MW water soluble PEI was added to displace all of the cyanide ions and capture all of the copper ions. Following membrane separation, the copper was then recovered by electrolysis and after passing the cyanide solution through an absorbent column to remove any PEI, the solution was pumped to the milling circuit.

In a further instance, a Type(II) strong-base ion exchange resin was used to recover the free cyanide and the copper cyanide. Following stripping of the ion exchange resin, the strip solution was contacted with the PEI-based polymer described in Example 4. After removal of the free cyanide using a membrane cartridge, the PEI was added and the cyanide was recovered in the permeate from the membrane cartridge and the chelated copper was obtained in the retentate. The copper was directly recovered as metal by electrowinning. The copper-depleted PEI solution was then available for recycle. In industrial applications, if the cyanide solution was to be recycled within a gold plant, the solution should be passed through a packed column to remove all traces of PEI thereby preventing any loss in the rate of gold dissolution.

Similarly, the polymers described in Examples 5 and 6 performed satisfactorily in this separation and recovery process.

After completion of the stripping of the ion exchange polymer or the ion exchange resin-containing superhydrophilic polymer, the eluent from the ultrafiltration membrane cartridge was recycled for further stripping cycles, any excess sodium cyanide was bled off, filtered to remove any PEI, and pumped to the leach circuit. The copper-PEI retentate was either pumped directly to an electrowinning unit for copper recovery; or the copper-containing PEI retentate was acidified to release the copper prior to copper being recovered by electrowinning 5. Bacterial Oxidation Plants Gold-containing sulphide ores are normally found to be refractory to cyanidation processes. That is, the amount of gold which may be recovered by direct cyanidation of the ore is low and therefore not economic. To overcome this problem, industry has adopted a range of oxidation processes to remove the sulphur from the sulphide mineral thus enabling the gold to then be recovered by conventional cyanidation practice. One recently adopted method for oxidation of the sulphide minerals is to employ bacterial oxidation processes in which sulphur-consuming bacteria to oxidise the pyritic ore. Any cyanide or thiocyanate returning into the system has been found to be toxic to these oxidising bacteria. As little as 5 mg/l or less of thiocyanate has been found to destroy these bacteria. Thus, the removal of residual free and WAD cyanide and thiocyanates from these tailings solutions is desired. Whilst it is possible to destroy the cyanide and the thiocyanate, it is preferred if they are removed prior to the tailings slurry being discharged to the tailings dam. Such removal and recovery can be accomplished using the methodology discussed in Examples 3 and 4 above. Thiocyanate containing solutions can be separated from the cyanide by membrane-based technology and the thiocyanate destroyed by known methods, or the thiocyanate may be reconverted to cyanide by ozonation, exposure to UV light, etc.

The reference to any prior art in this specification is not, and should not be taken as, an acknowledgment or any form of suggestion that that prior art forms part of the common general knowledge in Australia.

Those skilled in the art will appreciate that the invention described herein is susceptible to variations and modifications other than those specifically described. It is to be understood that the invention includes all such variations and modifications which fall within its spirit and scope. The invention also includes all of the steps, features, compositions and compounds referred to or indicated in this specification, individually or collectively, and any and all combinations of any two or more of said steps or features.

What is claimed is:

1. A process for the recovery or removal of metal species from a solution or slurry comprising the steps of:
   a) contacting the solution or slurry with a polymeric material, selected from the group consisting of a solid superhydrophilic polyurethane polymer containing a chelating and/or solvating agent and a water insoluble polymeric chelating agent dispersed in a water insoluble carrier solution to load the polymeric material with metal species;
   b) separating the loaded polymeric material from the solution or slurry; and
   c) recovering or removing the metal from the polymeric material.

2. A process for the recovery or removal of metal species from a leach solution or slurry comprising the steps of:
   a) contacting the leach solution or slurry with a polymeric material, selected from the group consisting of a solid superhydrophilic polyurethane polymer containing a chelating agent and/or a solvating agent and a water insoluble polymeric chelating agent dispersed in a water insoluble carrier solution to load the polymeric material with metal species;
   b) separating the loaded polymeric material from the leach solution or slurry; and
   c) recovering or removing the metal species from the polymeric material; wherein the leach solution or slurry comprises a metal complex, said leach solution or slurry being contacted with said polymeric material for a period sufficient for the metal to be bound to the polymeric material and at least a portion of the ligands of the metal complex to be displaced therefrom and returned to the leach solution or slurry to be available to coordinate with further metal values.

3. A process according to claim 1 or 2, wherein the polymeric material includes a long chain nitrogen-, oxygen-, and/or sulphur-containing polymer.

4. A process according to claim 1 or 2, wherein the polymeric material includes a polyethyleneimine polymer or polyethyleneimine-based polymer and/or polyethylene glycol or polyethylene glycol-based polymers with molecular weights generally in excess of 500.

5. A process according to claim 1 or 2, wherein the polymeric material includes a macrocyclic polyether containing a minimum of two ether (—O—) groups in the form of a ring.

6. A process according to claim 1 or 2, wherein the polymeric material includes a polyethyleneimine polymer or modified polyethyleneimine polymer tethered to an organic or inorganic substrate.

7. A process according to claim 1 or 2, wherein the polymeric material includes a macrocyclic polyether containing a minimum of four ether (—O—) groups in the form of a ring.

8. A process for the recovery of metal species from a solution or slurry containing metal cyanide species, comprising the steps of:
   a) contacting the solution or slurry with a water insoluble polymeric chelating or coordinating agent to load the water insoluble polymeric agent with the metal species;
   b) separating the loaded water insoluble polymeric agent by either solid/liquid separation or liquid/liquid separation such that cyanide is displaced and reports in the aqueous phase and complexed metal species reports in the solid phase or the organic phase;
   c) recovering the metal species from the solid or organic phase; and optionally
   d) recirculating the cyanide-rich solution from step b) and/or the solid or the water insoluble polymeric agent-rich solution following step c).

9. A process according to claim 8, wherein free cyanide is removed by membrane separation prior to the introduction of the water insoluble polymeric agent to the solution or slurry.

10. A process according to claim 8, wherein the metal species is recovered by electrowinning.

11. A process according to claim 10, wherein electrowinning is conducted in an electrochemical cell which is provided with a membrane to maximise cyanide recovery and minimise cyanide destruction at the anode.

12. A process according to claim 8 wherein the polymeric material includes a polyethyleneimine or a modified polyethylene imine tethered to an inorganic or an organic substrate.

* * * * *